United States Patent
Rathgeber

(10) Patent No.: US 10,059,532 B2
(45) Date of Patent: Aug. 28, 2018

(54) CONVEYOR

(71) Applicant: Homag Holzbearbeitungssysteme GmbH, Schopfloch (DE)

(72) Inventor: Peter Rathgeber, Dornstetten (DE)

(73) Assignee: HOMAG HOLZBEARBEITUNGSSYSTEME GMBH, Schopfloch (DE)

( * ) Notice: Subject to any disclaimer, the term of this patent is extended or adjusted under 35 U.S.C. 154(b) by 0 days.

(21) Appl. No.: 14/856,725

(22) Filed: Sep. 17, 2015

(65) Prior Publication Data

US 2016/0075523 A1    Mar. 17, 2016

(30) Foreign Application Priority Data

Sep. 17, 2014  (DE) .................. 10 2014 218 641

(51) Int. Cl.
| | | |
|---|---|---|
| *B65G 39/071* | (2006.01) | |
| *B65G 39/10* | (2006.01) | |
| *B65G 47/74* | (2006.01) | |
| *B65G 15/64* | (2006.01) | |
| *B65G 37/00* | (2006.01) | |
| *B65G 21/20* | (2006.01) | |

(52) U.S. Cl.
CPC .......... *B65G 47/74* (2013.01); *B65G 15/64* (2013.01); *B65G 37/00* (2013.01); *B65G 39/10* (2013.01); *B65G 21/20* (2013.01); *B65G 39/071* (2013.01)

(58) Field of Classification Search
CPC .............................. B65G 39/071; B65G 39/10
USPC .................... 198/834, 835, 841, 837, 840
See application file for complete search history.

(56) References Cited

U.S. PATENT DOCUMENTS

| | | | |
|---|---|---|---|
| 207,626 A | 9/1878 | Sargent | |
| 3,327,839 A | 6/1967 | Sigety et al. | |
| 3,610,387 A * | 10/1971 | Vom Stein ............. | B65G 39/09 193/35 R |
| 3,951,256 A * | 4/1976 | Gurewitz ............... | B65G 15/02 198/831 |
| 4,015,484 A | 4/1977 | Taylor | |
| 4,750,254 A | 6/1988 | Kalmbach | |

(Continued)

FOREIGN PATENT DOCUMENTS

| | | |
|---|---|---|
| CN | 102381536 A | 3/2012 |
| DE | 1531867 A | 1/1970 |

(Continued)

OTHER PUBLICATIONS

European Search Report dated Mar. 2, 2016 with respect to EP Application No. 15181960.4—a potential related application—cited only for references that are disclosed therein.

(Continued)

*Primary Examiner* — Gene O Crawford
*Assistant Examiner* — Lester III Rushin
(74) *Attorney, Agent, or Firm* — Scott R. Cox

(57) ABSTRACT

A conveyor for use with panel-shaped workpieces which can be fed to a machining such as a profile machining is disclosed. The workpieces to be machined are components used in the furniture and structural element industry, such as floor panels, doors, tabletops, or the like. The conveyor belt of the conveyor has a profiling element in a direction of extension, which profiling element is in engagement with a guide element.

16 Claims, 5 Drawing Sheets

(56) References Cited

U.S. PATENT DOCUMENTS

| | | | | |
|---|---|---|---|---|
| 4,827,637 A | * | 5/1989 | Kahlbacher | ............... E01H 1/05 |
| | | | | 15/256.5 |
| 5,017,969 A | * | 5/1991 | Mitomi | ............. G03G 15/1655 |
| | | | | 198/835 |
| 5,157,438 A | * | 10/1992 | Beale | ................ H05K 13/0069 |
| | | | | 355/53 |
| 9,694,457 B2 | | 7/2017 | Rathgeber | |
| 2004/0182214 A1 | | 9/2004 | Courtois et al. | |
| 2009/0000920 A1 | | 1/2009 | Honeycutt | |
| 2009/0183972 A1 | | 7/2009 | Gauss et al. | |
| 2009/0188772 A1 | * | 7/2009 | Massotte | ............... D06B 17/00 |
| | | | | 198/341.01 |
| 2009/0314612 A1 | | 12/2009 | Krallinger | |
| 2010/0059343 A1 | | 3/2010 | Uchida et al. | |
| 2010/0154933 A1 | | 6/2010 | Hatch, Jr. et al. | |

FOREIGN PATENT DOCUMENTS

| | | | | |
|---|---|---|---|---|
| DE | 2303870 | A1 | | 10/1973 |
| DE | 2923850 | A1 | * 12/1980 | ............... C08J 5/10 |
| DE | 8114121 | U1 | | 5/1981 |
| DE | 4234681 | C2 | | 1/1997 |
| DE | 102004049436 | A1 | | 4/2006 |
| DE | 202009007100 | U1 | | 8/2009 |
| DE | 102013012422 | A1 | | 1/2014 |
| EP | 1479492 | B1 | | 5/2006 |
| EP | 0917935 | B1 | | 9/2009 |
| EP | 2253441 | A1 | | 11/2010 |
| EP | 2253442 | A1 | | 11/2010 |
| EP | 2614940 | A1 | | 7/2013 |
| FR | 775514 | A | | 12/1934 |
| FR | 2660292 | A1 | | 10/1991 |
| GB | 509048 | A | | 6/1939 |
| IT | RN20120053 | A1 | | 5/2014 |
| JP | S5467980 | A | | 5/1979 |
| JP | 2003292275 | A | | 10/2003 |
| JP | 2005264193 | A | | 9/2005 |
| WO | WO2004113037 | A1 | | 12/2004 |

OTHER PUBLICATIONS

European Search Report dated Mar. 22, 2016 with respect to EP Application No. 15189723/8—a potential related application—cited only for references that are disclosed therein.

English translation of Chinese Office Action dated Oct. 13, 2017 with respect to parallel Chinese patent application No. 201510594069.6.

European Summons Communication dated Nov. 24, 2017 with respect to EP Application No. 15181960.4—a potential related application—cited only for references that are disclosed therein, all other cited references previously disclosed.

Email from European Examiner dated Feb. 27, 2018—document not translated to English and only cited for the reference disclosed therein.

\* cited by examiner

CONVEYOR

TECHNICAL FIELD

The present invention relates to a conveyor using which particularly panel-shaped workpieces can be fed to a machining such as a profile machining. The workpieces to be machined within the context of the present application are preferably components used in the furniture and structural element industry or insulation board industry, e.g. floor panels, doors, tabletops, insulation boards, or the like. Furthermore, the invention relates to a machining device having such a conveyor.

PRIOR ART

In the field of profile machining of floor panels, double-end profilers are conventionally used. Double-end profilers comprise a circulating conveyor chain as well as a circulating belt arranged above the conveyor chain. The workpieces are clamped between the conveyor chain and the belt during their movement and in this state are guided past machining stations. At these machining stations, various working steps such as milling, planing, grinding, or the like can be carried out.

For example, EP 1 878 674 A1 shows a chain link for a circulating transport chain of a machine tool, which is used in a double-end profiler. The chain link described is provided, observed in the circulation direction, with a ferromagnetic material between a roller pair and a roller in order to guarantee secure deflection to deflection rollers during the high speeds that occur.

Furthermore, EP 2 614 940 A1 describes a four-sided machining device. Even though the conveyor belt described in this document is preferably a chain conveyor, a belt conveyor or a roller conveyor can also be used.

Owing to the increasingly high conveying speeds occurring in practice, the known conveyor chain systems have reached their power limit. Vibration problems as well as centripetal forces at the deflection rollers in the end result in high wear, which requires regular maintenance of the conveyor chain and consequently causes costs.

In order to achieve even higher conveying speeds, conveyor belts that are guided on an air cushion are known. However, the disadvantage of such systems is that belt guidance cannot be guaranteed with sufficient accuracy. In particular when machining floorboards and similar workpieces, it is necessary to ensure a precise and reproducible positioning of the workpieces with respect to the machining tools. Moreover, the air cushion used for guiding the conveyor belt is disadvantageous also from an economic point of view since the provision of the air cushion requires a comparably high expenditure of energy. This in turn is reflected in the operating costs.

THE SUBJECT MATTER OF THE INVENTION

The present invention aims at solving the aforementioned problems and at providing a conveyor which allows an exact alignment of workpieces with respect to the machining tools at a high conveying speed. Furthermore, operating and/or maintenance costs are to be reduced.

Thus, the present invention provides a conveyor according to claim 1, using which the aforementioned aims are achieved. Further examples of preferred embodiments are described in the dependent claims and explained in the following description.

A core idea of the present invention is to design a conveyor belt of a conveyor in such a manner that the forces that occur when the workpieces are moved are optimally transferred between the conveyor belt and the guiding thereof.

The present invention provides a conveyor for a machining device for machining preferably panel-shaped workpieces. Such workpieces may be, for example, floor panels. The conveyor comprises a support as well as a conveyor belt. The conveyor belt circulates about the support. Furthermore, a guide means is provided. The guide means may be provided at the support or a support component attached to the support. The conveyor belt has a profiling in the direction of extension, which profiling is in engagement with the guide means.

Thus, the conveyor belt can also be supported in a horizontal direction, as a result of which smooth guiding is possible even at high conveying speeds. Since the conveying speeds can be increased, it is possible to move and optionally machine considerably more workpieces within the same time.

The compressed air mechanism for a conveyor belt, which is used in the prior art can be omitted, which in turn results in lower energy costs. Compared to chain conveyors, the costs for spare parts and maintenance are reduced. As compared to chain conveyors, a so-called polygon effect at the deflection rollers of the conveyor belt occurs to a considerably smaller extent or not at all, and significantly lower vibrations were observed during the transport of workpieces. This also has effects on machining tools which are used for workpieces that are moved using the conveyor according to the invention. Since the vibrations at these workpieces could be reduced, the service life of these machining tools increases.

Preferably, in the vertical direction above the conveyor there is a continuously circulating top pressure (optionally also designed as a belt) that is arranged in such a manner that a gap for a workpiece is formed between the conveyor belt of the conveyor and the top pressure.

According to one embodiment of the present invention, the profiling is a recess, in particular a groove that is truncated-cone-shaped, v-shaped or u-shaped in cross section (perpendicular to the direction of extension of the conveyor belt). The guide means can engage with this groove, thus providing a guiding in the horizontal direction (perpendicular to the direction of extension of the conveyor belt).

In an alternative embodiment, the profiling is a protrusion that is truncated-cone-shaped, v-shaped or rectangular in cross section (perpendicular to the direction of extension). In this case, the protrusion engages with the guide means.

According to a further embodiment of the present invention, the conveyor belt has on its contact side on which a workpiece is placed an adhesion-enhancing coating, in particular on a polyurethane basis. With such a coating, a workpiece can be held even better during conveying such that a reproducible working result is ensured.

Furthermore, at least one guide roller can be provided as the aforementioned guide means, and at least one first support roller can moreover be provided for supporting the conveyor belt. The combination of the at least one guide roller and the at least one first support roller is in particular provided several times. It is preferred that the guide roller also transfers forces in the horizontal direction, i.e., in other words, keeps the conveyor belt straight in the direction of extension thereof. The first support roller in turn primarily serves to absorb forces in the vertical direction. In a preferred embodiment, a first support roller is provided on either side of the guide roller, transversely to the direction of extension of the conveyor belt or the traveling direction.

In one embodiment, a plurality of guide rollers and first support rollers and optionally second support rollers is provided in the direction of extension of the conveyor belt.

According to a further variant of the present invention on a side of the support that is in the vertical direction the upper side, the guide roller and the first support roller are each hooked into protrusions of a support component (individual suspension of the support roller and guide roller), or a plurality of rotating shafts mounted on a support component receive the guide roller and the first support roller together. If the guide roller and the first support roller are mounted so as to be rotatable individually, this is preferably a component having a roller and a shaft/ball bearing.

In a further variant, a second support roller can be provided between the first support roller and the guide roller, the rotational axis of which is arranged in the direction of extension of the conveyor belt offset with respect to the rotational axis of the first support roller and/or guide roller. In this case as well, it is possible to mount the cited rollers individually. In a preferred embodiment, a first support roller is provided on either side of the guide roller, transversely to the direction of extension of the conveyor belt or the traveling direction, and a second support roller is provided between the guide roller and the first support roller.

Furthermore, the rotating shafts according to a further modification of the present invention are attached to a common support component which is permanently fixed, e.g. welded, screwed or glued, to the support. Thus, a rigid construction is provided.

According to a further embodiment, the guide roller is centrally arranged with respect to the support component, and a first support roller is arranged on either side of the guide roller. This results in a construction that runs particularly smoothly.

According to a further modification, the conveyor according to the invention is characterized in that the diameter of the guide roller is greater than the diameter of the first support roller. Thus, the guide roller can enter the recess of the conveyor belt while the first support roller faces a guiding side of the conveyor belt facing the support of the conveyor.

If the profiling of the conveyor belt is a protrusion, the guide roller may have a recess that is truncated-cone-shaped, v-shaped or rectangular in cross section. The design of the guide roller depends on the design of the protrusion. In other words, the shape of the guide roller is complementary to the shape of the protrusion. Thus, secure guiding in a horizontal direction can be provided.

According to a further embodiment of the present invention, it is provided that the rotational axis of the first support roller extends in the horizontal direction, and the rotational axis of the guide roller extends in the vertical direction. Thus, the forces acting on the support roller and the guide roller are decoupled.

According to one embodiment of the present invention, on a side of the support that is the lower side in the vertical direction, a plurality of rotating shafts is furthermore provided, which rotating shafts each receive at least one third support roller, preferably two third support rollers. Thus, the conveyor belt can be guided tautly and securely.

The conveyor according to the aforedescribed embodiments is preferably used in a machining device such as a double-end profiler. Since the workpieces can be conveyed securely and at high speeds, the throughput of such a machining device can be increased.

Furthermore, the invention is directed at a machining device having a conveyor according to any one of the previous aspects and the variants thereof, which machining tool comprises at least one unit for narrow surface or profiling machining. The unit is provided (observed in the traveling direction) preferably laterally to the support. In particular, a continuously circulating top pressure is provided in the vertical direction above the conveyor, which top pressure is arranged such that a gap for a workpiece is formed between the conveyor belt of the conveyor and the top pressure.

The machining device may furthermore comprise at least one support skid that extends laterally along the conveyor belt and substantially parallel thereto. Preferably, the support skid is arranged in the area of operation of a unit for narrow surface or profiling machining. This arrangement is particularly suitable when machining floor panels to ensure a support of the floor panels during the machining by the unit.

In a further variant, a support skid can be provided on either side of the conveyor belt, with the support skids being opposite to each other. These support skids are also preferably arranged in the area of operation of a unit for narrow surface or profiling machining.

In addition, a spring-mounted pressure rail can be provided which extends above the support skid and substantially parallel thereto. Thus, workpieces of different thickness can also be supported during the machining.

DETAILED DESCRIPTION OF THE PREFERRED EMBODIMENTS

In the following, preferred embodiments of the present invention will be explained in detail with reference to the accompanying drawings. Further modifications cited in this context of individual features of the described embodiments can each be combined individually in order to form new embodiments.

Figure 1:
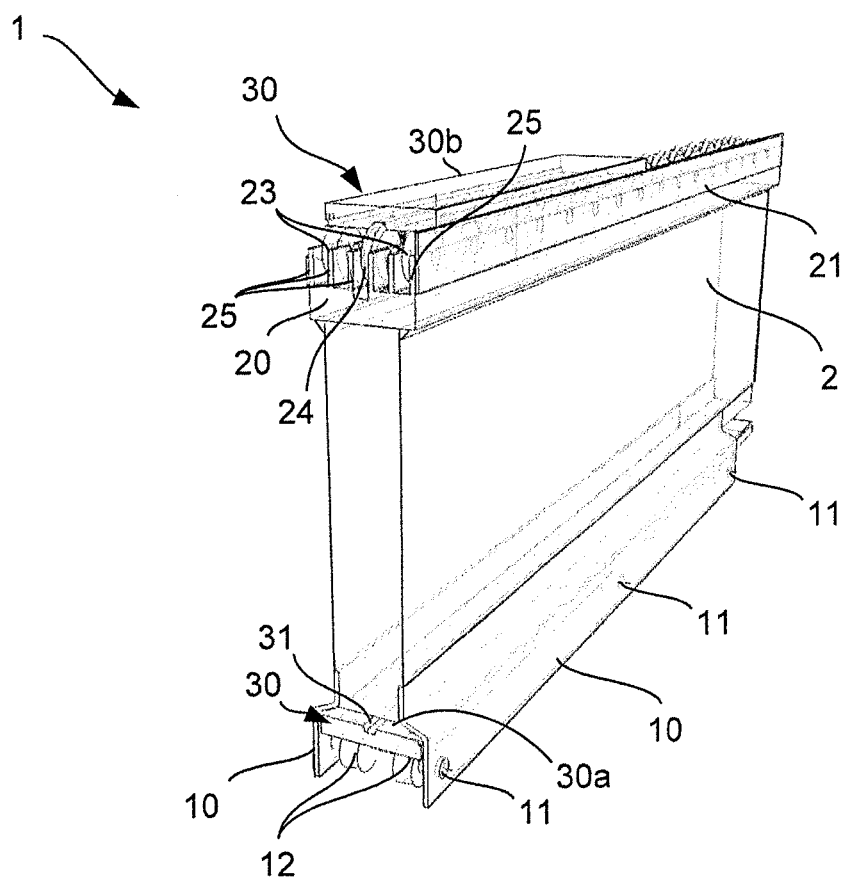
FIG. 1 is a perspective view of a part of the conveyor according to the invention.
Figure 2:
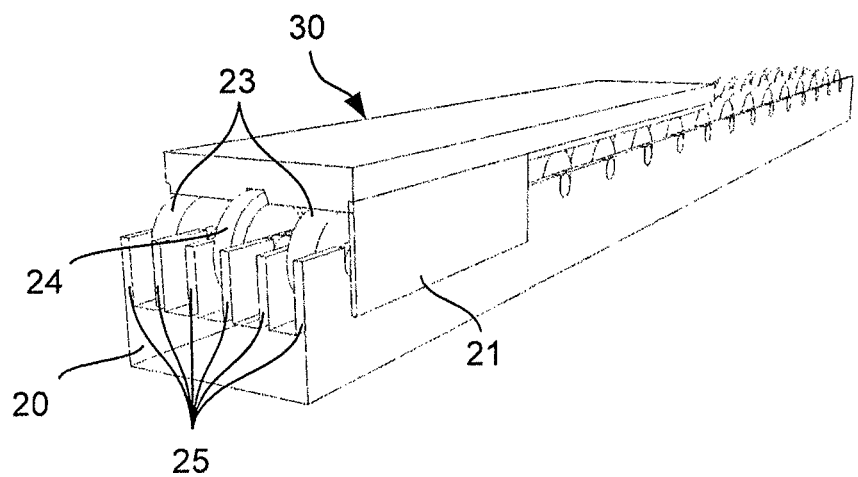
FIG. 2 is a perspective detailed view of the embodiment shown in FIG. 1.

FIG. 1 shows a detail of the conveyor 1 according to the invention.

The conveyor 1 comprises a support 2 that is supported against the ground via rails 10 that are attached on both sides. Together with a lower portion of the support 2, the rails 10 form an interspace extending along the support 2, within which a circulating conveyor belt 30 is guided underneath the support 2.

The conveyor belt 30 is a continuously circulating conveyor belt having a guiding side 30a and a contact side 30b. While the guiding side 30a faces the support 2, the contact side 30*b* faces the opposite direction. For example, the conveyor belt may comprise tensile cords included in a matrix material.

In the first embodiment of the present invention, a recess 31 extending in the direction of extension of the conveyor belt 30 is provided in the area of the guiding side 30*a*, the function of which will be explained in detail at a later point.

In the embodiment shown in FIG. 1, the conveyor belt 30 has a thickness of approximately 8 mm and a width (transversely to the direction of extension) of 30 to 80 mm, preferably 40 to 50 mm. The recess 31 is provided substantially centrally in the width direction.

Figure 3:
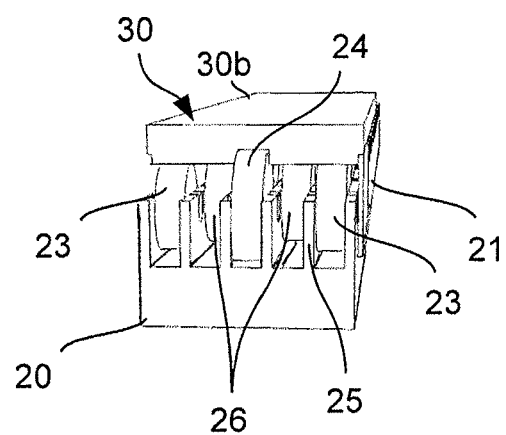
FIG. 3 is a front view of the detailed view shown in FIG. 2.

In an area arranged above the support 2 in the vertical direction, a support component 20 is connected, e.g. welded, to the support 2. The support component 20 receives a plurality of guide rollers and support rollers, which are each mounted individually on protrusions 25 of the support component. In the present embodiment, two first support rollers 23 and one guide roller 24 are attached in a horizontal line transversely to the conveying direction/direction of extension of the conveyor belt 30. Offset with respect thereto, one second support roller 26 each is provided between the first support rollers and the guide roller (cf. FIG. 3). In other words, the guide roller 24 is arranged approximately centrally with respect to the support component 20.

Covers 21 are laterally attached to the support component 20 (in FIG. 1, only one cover 21 is shown), which serve as dust protection for the first support rollers 23, the second support rollers 26 and the guide roller 24.

The guide roller 24 has a somewhat greater diameter than the two first support rollers 23 and the second support rollers 26. Thus, the guide roller 24 protrudes farther from the support component 20 in the vertical direction than the two second support rollers 23.

The guide roller 24 therefore enters the recess 31 of the conveyor belt 30 at least in sections. The recess 31 is designed such that the guide roller 24 touches the base of the recess 31, which means that forces are transferred in the vertical direction from the conveyor belt 30 to the guide roller 24. Furthermore, the guide roller 24 ensures a lateral (horizontal) guiding of the conveyor belt 30, with there being a certain play in the horizontal direction between the guide roller 24 and the side wall of the recess 31.

In the present embodiment, the recess 31 has a contour that is truncated-cone-shaped in cross section. This proves to be advantageous when guiding the conveyor belt 30 in the horizontal direction.

The primary task of the first support rollers 23 and the second support rollers 26 is to receive the conveyor belt 30 such that forces acting in the vertical direction are also transferred from the conveyor belt 30 to the support rollers 23. Such forces occur when a workpiece is placed on the contact side 30*b* of the conveyor belt 30 and, where appropriate, an opposite conveyor belt (not shown) applies a force of pressure on the workpiece. In addition to providing support in the vertical direction, the guide rollers 24 take on the task of guiding in the horizontal direction.

As a result, an exact guiding of the conveyor belt 30 in the vertical and horizontal directions is thus ensured by a combination of the first support rollers 23, the second support rollers 26 and the guide roller 24.

Rotating shafts 11, which receive third support rollers 12, are provided between the rails 10 that are attached to the lower portion of the support 2. In the present embodiment, two third support rollers 12 each are provided at the rotating shafts 11, on which rollers the conveyor belt 30 rests. However, according to one modification, it is possible to attach only one support roller to a rotating shaft 11 instead of the two third support rollers 12 or, alternatively, more than two third support rollers 12.

In the present embodiment, the first support rollers 23 and the second support rollers 26 are dimensioned substantially identical to the third support rollers 12.

Figure 4A:
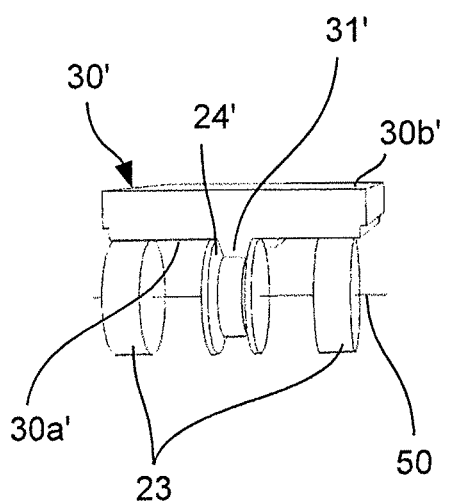
FIG. 4a shows a second embodiment of the present invention.

FIG. 4*a* shows a second embodiment of the present invention, in particular a conveyor belt 30' with a guiding side 30*a*' and a contact side 30*b*'. This basically differs from the first embodiment in that the conveyor belt 30' has a protrusion 31' on the guiding side 30*a*', which protrusion 31' has a contour that is truncated-cone-shaped or v-shaped in cross section (transversely to the direction of extension of the conveyor belt 30'). In a variant of the second embodiment, the protrusion 31' has a contour that is rectangular in cross section.

Complementary to the contour of the protrusion 31', the guide roller 24' of the second embodiment has a recess with which the protrusion 31' of the conveyor belt 30' engages. The first support rollers 23 of the second embodiment are formed analogously to the first support rollers of the first embodiment and are arranged in the horizontal direction laterally to the guide roller 24'. The same is true of any further support rollers that may be available, which correspond to the second support rollers of the first embodiment.

Figure 4B:
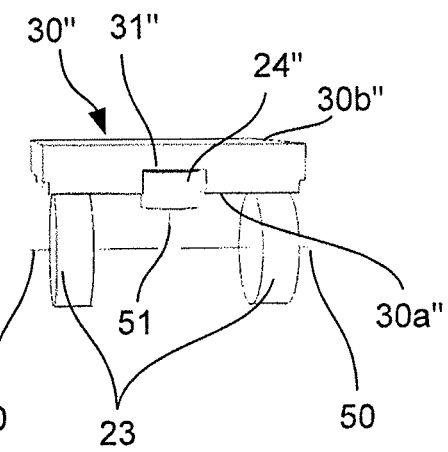
FIG. 4b shows a third embodiment of the present invention.

FIG. 4*b* shows a third embodiment of the present invention. Again, the conveyor belt 30" has a guiding side 30*a*" and a contact side 30*b*". According to the third embodiment, two first support rollers 23 are provided, which are arranged on a common rotating shaft in the embodiment shown. This arrangement basically corresponds to the first embodiment.

However, the guide roller 24" of the third embodiment of the present invention is rotatably arranged about a vertical rotational axis 51. The first support rollers 23 are rotatably arranged about horizontal rotational axes 50, but can also have a common rotational axis in the horizontal direction. The same is true of any further support rollers that may be available, which correspond to the second support rollers of the first embodiment.

The conveyor belt 30" of the third embodiment has on the guiding side 30*a*" of the conveyor belt 30" a recess 31" extending in the direction of extension of the conveyor belt 30" which forms a profile that is rectangular when viewed in cross section. The guide roller 24" engages with this profile of the recess 31", thus ensuring that the conveyor belt 30" is supported in the horizontal direction.

When doing so, the guide roller 24" does not touch the bottom of the recess 31". In order to achieve improved or more uniform support in the vertical direction, a guide roller 24" having a vertical rotational axis 51 and a guide roller 24 having a horizontal rotational axis can be provided alternately.

According to a further variant of the present invention, the conveyor belt 30, 30', 30" according to the previously described embodiments is provided on the contact side 30*b* with a coating using which the workpiece lying on this side of the conveyor belt can be better held during conveying.

According to the aforedescribed embodiments, the guiding of the conveyor belt 30, 30', 30" in the horizontal direction is provided in a substantially central portion. However, according to further variants of the present invention, it is possible to arrange the guide roller in an offset manner or to provide several guide rollers between the first/second support rollers 23/24.

Moreover, it is possible according to further variants that the guide roller changes places with the first support rollers such that according to these variants of the described embodiments two guide rollers are provided laterally to a substantially centrally arranged first support roller.

Figure 5:
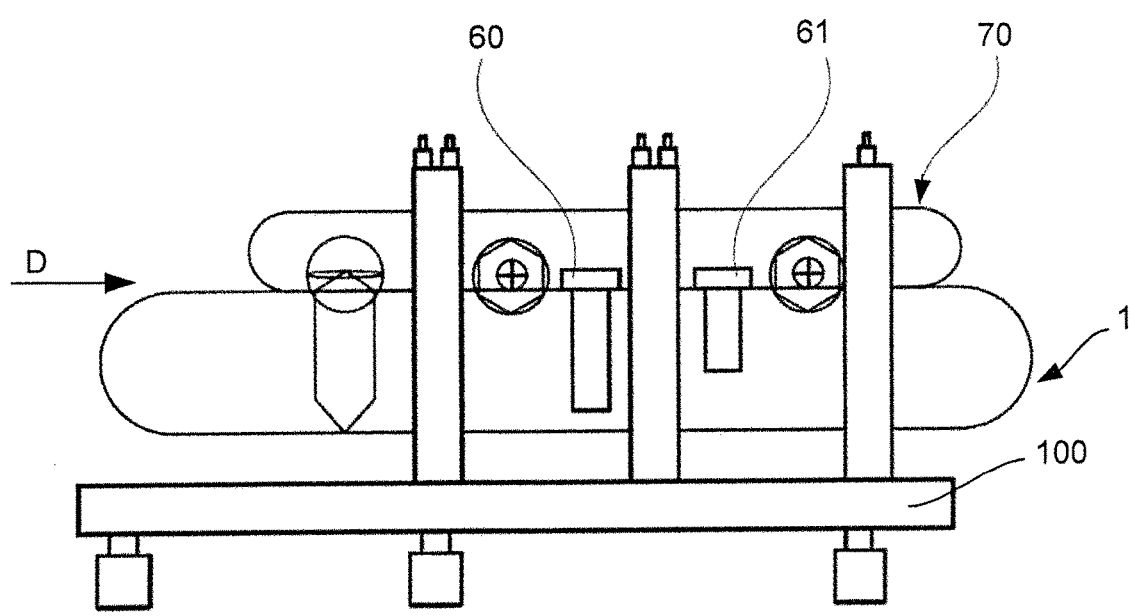
FIG. 5 is a schematic side view of a machining device with the conveyor according to the invention.

FIG. 5 is a schematic side view of a machining device, namely a double-end profiler, in which the conveyor 1 according to the present invention is used. According to this embodiment, the conveyor 1 is supported on a frame 100.

In the machining device for narrow surface or profiling machining, the conveyor 1 is provided which grabs a workpiece on the underside thereof and leads it past several, optionally pivotable, narrow surface or profiling machining units 60 and 61 (traveling direction D). The conveyor 1 can have one or more conveyor belts 30. Particularly preferred are two parallel conveyor belts 30.

In the vertical direction above the conveyor 1, a continuously circulating top pressure 70 is provided, which is arranged such that a gap for a workpiece is formed between the conveyor belt 30 of the conveyor 1 and the conveyor belt (not shown) of the top pressure 70. Owing to a corresponding dimensioning of the gap, a workpiece is clamped such that various machining steps can be carried out during the run-through, without the workpiece shifting.

In the machining device shown in FIG. 5 various types of machining can be carried out, in particular machining processes such as planing, grooving, grinding, sawing or milling. For example, the units for narrow surface or profiling machining 60 and 61 can be profile milling machines or profile grinding devices using which the workpieces are machined in a lateral edge area while the workpieces are held and conveyed by the conveyor. This applies in particular to the narrow side of a workpiece but possibly also, in part, to the main sides thereof.

Even though this is not explicitly shown in the figures, it may be provided that the machining device also has at least one support skid which extends laterally along the conveyor belt and substantially parallel thereto. By the at least one support skid a reference plane for the conveyed workpieces can be defined such that it is rendered possible to additionally support the workpieces during the machining operation. In a further variant, a support skid can be provided on either side of the conveyor belt, with the support skids being opposite to each other.

In addition, a spring-mounted pressure rail can be provided which extends above the support skid and substantially parallel thereto. Owing to the pressure rail and a support skid arranged thereunderneath, panel-shaped workpieces can be stably guided in order to achieve an exact positioning and to avoid that the workpiece shifts during a machining by a machining tool.

The invention claimed is:

1. A conveyor for a machining device for machining panel-shaped workpieces including floor panels, comprising
a support with a conveyor belt circulating about the support, and
a guide element comprising at least one guide roller and at least one first support roller for supporting the conveyor belt,
characterized in that
the conveyor belt comprises a profiling element in a direction of extension, which profiling element is in engagement with the guide element, wherein the profiling element comprises a recess with a groove, and wherein the guide roller extends into the recess, and
wherein the machining device further comprises a unit for narrowing or profiling a surface of the workpieces, which unit is located lateral to the support of the conveyor belt arranged in the area of the unit, wherein the unit is selected from the group consisting of a planning device, a grooving device, a grinding device, a sawing device, and a milling device.

2. The conveyor according to claim 1, characterized in that the profiling element has a shape in cross section selected from the group consisting of truncated-cone-shaped, v-shaped and u-shaped.

3. The conveyor according to claim 1, characterized in that the conveyor belt has an adhesion-enhancing polyethylene coating on a contact side on which the workpiece is placed.

4. The conveyor according to claim 1, characterized in that on a side of the support that is an upper side in a vertical direction, the guide roller and the first support roller are each hooked into protrusions of a support component.

5. The conveyor according to claim 1, characterized in that a second support roller is provided between the first support roller and the guide roller, wherein a rotational axis of the first support roller is arranged in the direction of extension of the conveyor belt offset with respect to a rotational axis of the second support roller.

6. The conveyor according to claim 5, characterized in that the support component is permanently fixed to the support by a means selected from the group consisting of welding, screwing and gluing.

7. The conveyor according to claim 5, characterized in that the guide roller is centrally arranged with respect to the support component, and the first support roller is arranged on either side of the guide roller.

8. The conveyor according to claim 1, characterized in that a diameter of the guide roller is greater than a diameter of the first support roller.

9. The conveyor according to claim 1, characterized in that
a rotational axis of the first support roller extends in a horizontal direction, and
a rotational axis of the guide roller extends in a vertical direction.

10. The conveyor according to claim 9, characterized in the guide roller with a vertical rotational axis and the guide roller with a horizontal rotational axis are alternately arranged in a direction of extension of the conveyor belt.

11. The conveyor according to claim 1, characterized in that on a side of the support that is on a lower side in a vertical direction, a plurality of rotating shafts is provided, which rotating shafts each receive at least one third support roller.

12. The conveyor of claim 1 wherein a plurality of rotating shafts mounted on a support component receive the guide roller and the first support roller together.

13. The conveyor of claim 1 further comprising a support skid which extends laterally along the conveyor belt and is substantially parallel thereto.

14. The machining device of claim 13 wherein a second support skid is provided, one on either side of the conveyor belt, with the support skids being opposite to each other.

15. The machining device of claim 13, further comprising a spring-mounted pressure rail which extends above the support skid and is substantially parallel thereto.

16. A machining device comprising the conveyor according to claim 1 arranged in an area of operation of a unit for narrowing a surface of the workpiece or profiling machining, and further comprising a support skid which extends laterally along the conveyor belt and is substantially parallel thereto, wherein second support skids are provided, one on either side of the conveyor belt, with the support skids being opposite to each other.

* * * * *